United States Patent
Kitching

(10) Patent No.: US 11,346,725 B2
(45) Date of Patent: May 31, 2022

(54) TEMPERATURE MEASUREMENT

(71) Applicant: BAE SYSTEMS plc, London (GB)

(72) Inventor: Stuart John Kitching, Rochester (GB)

(73) Assignee: BAE SYSTEMS plc, London (GB)

( * ) Notice: Subject to any disclaimer, the term of this patent is extended or adjusted under 35 U.S.C. 154(b) by 322 days.

(21) Appl. No.: 16/483,275

(22) PCT Filed: Feb. 22, 2018

(86) PCT No.: PCT/GB2018/050456
§ 371 (c)(1),
(2) Date: Aug. 2, 2019

(87) PCT Pub. No.: WO2018/154299
PCT Pub. Date: Aug. 30, 2018

(65) Prior Publication Data
US 2020/0003630 A1    Jan. 2, 2020

(30) Foreign Application Priority Data

Feb. 23, 2017 (EP) ..................................... 17275024
Feb. 23, 2017 (GB) ..................................... 1702922

(51) Int. Cl.
*G01K 1/08* (2021.01)
*G01K 7/12* (2006.01)
*G01K 7/22* (2006.01)

(52) U.S. Cl.
CPC ................ *G01K 7/12* (2013.01); *G01K 7/22* (2013.01)

(58) Field of Classification Search
CPC combination set(s) only.
See application file for complete search history.

(56) References Cited

U.S. PATENT DOCUMENTS 5,046,447 A * 9/1991 Steinke .................... G07C 3/00
                                                    116/217
2004/0255998 A1    12/2004 Schuh
(Continued)

FOREIGN PATENT DOCUMENTS

| EP | 2157416 A2 | 2/2010 |
| EP | 2428780 A2 | 3/2012 |
| WO | 2018154299 A1 | 8/2018 |

OTHER PUBLICATIONS

International Preliminary Report on Patentability received for PCT Application No. PCT/GB2018/050456. dated Sep. 6, 2019. 9 pages.
(Continued)

*Primary Examiner* — Lisa M Caputo
*Assistant Examiner* — Nasir U. Ahmed
(74) *Attorney, Agent, or Firm* — Finch & Maloney PLLC

(57) ABSTRACT

A temperature sensor for a cold reference junction of a thermocouple is provided that may be incorporated permanently or removeably in a releasable connector having a first connector part arranged to engage releasably with a second connector part in which the thermocouple conductors terminate, so forming a cold reference junction for the thermocouple. When the two parts of the connector are engaged, the temperature sensor of the present invention is able to sense the temperature in the vicinity of a cold reference junction in the connector. The temperature sensor may be provided by embedding one or more thermistors into a flexible disk or plate-like seal able to fit around the conductors of the first connector part such that the thermistors make electrical contact with selected conductors of the first connector part and thermal contact with the cold reference junction.

19 Claims, 3 Drawing Sheets

(56) References Cited

U.S. PATENT DOCUMENTS

| | | | |
|---|---|---|---|
| 2009/0257722 A1* | 10/2009 | Fisher .................. | G02B 6/3878 |
| | | | 385/115 |
| 2010/0067562 A1* | 3/2010 | Wakabayashi ........... | G01K 1/14 |
| | | | 374/208 |
| 2010/0135357 A1* | 6/2010 | Chancy .................... | G01K 1/18 |
| | | | 374/179 |
| 2014/0050248 A1 | 2/2014 | Boehme et al. | |
| 2014/0269821 A1 | 9/2014 | Egley et al. | |
| 2014/0273639 A1* | 9/2014 | Larsen ............... | H01R 13/6466 |
| | | | 439/620.23 |

OTHER PUBLICATIONS

International Search Report and Written Opinion received for PCT Application No. PCT/GB2018/050456. dated Jun. 12, 2018. 11 pages.
Extended European Search Report received for EP Application No. 17275024.2, dated Aug. 4, 2017. 8 pages.
GB Search Report under Section 17(5) received for GB Application No. 1702922.4, dated Jul. 14, 2017. 4 pages.
GB Search Report under Section 17(6) received for GB Application No. 1702922.4, dated Sep. 21, 2017. 2 pages.

\* cited by examiner

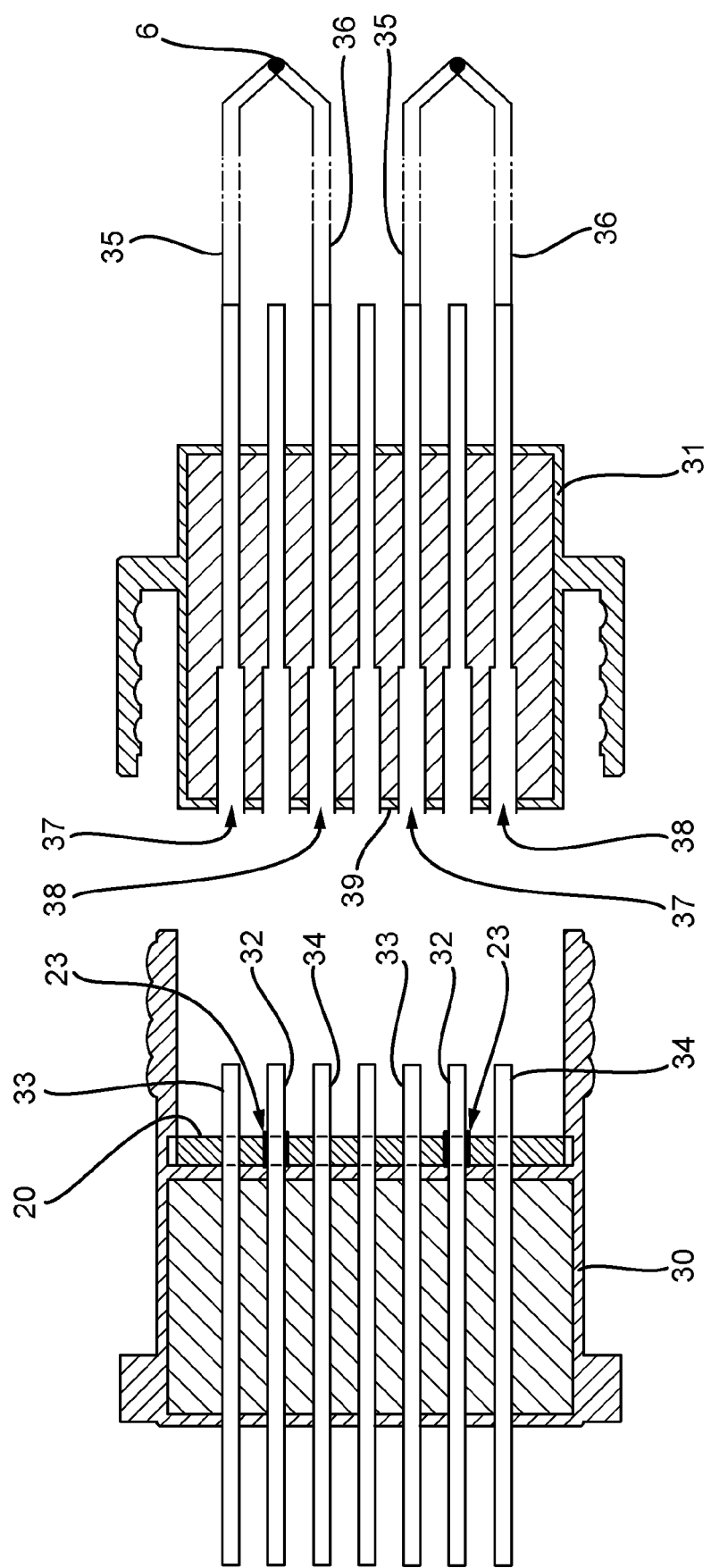

TEMPERATURE MEASUREMENT

This invention relates to temperature measurement systems and methods using thermocouples, in particular but not exclusively to implementations of a 'cold' reference junction of a thermocouple, associated sensors for determining the temperature of the cold reference junction and to associated measurement electronics and controls arranged to benefit from a cold reference junction implemented according to the present invention.

It is known in high temperature measurement applications, such as in the monitoring of aircraft engine temperatures, to use thermocouples linked to an associated electronics and processing module at which the temperature being sensed by the thermocouple may be determined. Such an electronics and processing module may typically be implemented as a replaceable circuit board module to which the thermocouple conductors may be coupled, the module including an on-board cold reference junction to complete the or each thermocouple.

The thermocouple conductors, for example of a nickel alloy Type 'K' thermocouple, comprise Chromel® and Alumel® conductors joined at a temperature sensing junction. The Chromel® and Alumel® conductors extend from the temperature sensing junction to a cold reference junction included within the associated module, the temperature of which may be determined by sensors, electronics and functionality within the module and at which point the voltage across the thermocouple conductors at the cold reference junction may be measured. From the voltage measured at the cold reference junction and a predetermined thermocouple characteristic function, typically implemented as a conversion table stored in the module for the particular type of thermocouple, the temperature at the sensing junction may be calculated.

To facilitate the replacement of the electronics and processing module, it is known to provide a releasable connector having one part, for example a 'male' connector part, fixed to the replaceable module, and a second part, for example a 'female' connector part, to which the thermocouple conductors are connected. The different thermocouple conductor materials continue through the two parts of the connector by use of connector pins made of the same respective material types such that the thermocouple conductors extend through to the cold reference junction included within the electronics and processing module.

According to a first aspect of the present invention, there is provided a temperature sensor for sensing the temperature of a cold reference junction of a thermocouple, comprising one or more temperature sensing components embedded within or affixed to a disk or plate of an electrically insulating material having a shape and configuration arranged to correspond with an arrangement of conductors in a releasable part of a connector, the connector including conductors arranged to form within the connector a cold reference junction of a thermocouple, such that the temperature sensor may be fitted in thermal contact with the cold reference junction of the thermocouple when formed within the connector.

The disk or plate may be provided with electrically conducting parts arranged to make electrical contact with selected conductors of the connector part, other than the conductors arranged to form a cold reference junction of the thermocouple, when the temperature sensor is fitted within the connector and wherein the one or more temperature sensing components are electrically connected to respective said electrically conducting parts. This enables the temperature sensing components to be connected to associated monitoring equipment through respective conductors of the connector.

By forming a cold reference junction within a releasable connector and providing a releasable temperature sensor that may be attached within an otherwise conventional connector part simplifies both the connector part and any associated electronics module that would otherwise need to have a cold reference junction and associated temperature sensor provided within the module itself. Furthermore, the thermocouple conductors no longer need to be extended through the connector to form the cold reference junction within the module. The present invention enables conventional copper conductors to be used in at least one part of the connector and enables an associated electronics module to sense the temperature of the cold reference junction within the connector through selected conductors of the connector and to determine the voltage across the thermocouple conductors at the cold reference junction through different respective conductors of the connector.

The connector may comprise a first connector part having an arrangement of conductor pins arranged to engage releasably with a corresponding arrangement of conductor pin sockets of a second connector part of the connector and wherein the disk or plate of the temperature sensor is provided with a pattern of holes formed therethrough, arranged to correspond with some or all of the conductor pins in the arrangement of conductor pins of the first connector part.

The electrically conducting parts may be provided within respective holes through the disk or plate such that they make electrical contact with the respective conductor pins when the temperature sensor is fitted over the conductor pins of the first connector part.

The disk or plate may be made using a flexible material. Furthermore, the disk or plate may include a region made using a thermally conductive material and the one or more temperature sensing components is or are embedded within or arranged in contact with the region of thermally conductive material such that a substantially isothermal region may be established in the vicinity of the one or more temperature sensing components.

The temperature sensor may be releasable from and retrofittable to the conductor pins of the connector. In such a way the temperature sensor can be used in conjunction with standard connector components to enable thermocouples to be constructed and used in the simplified manner described above.

According to a second aspect of the present invention, there is provided a thermocouple connector comprising a first connector part having a plurality of conductors arranged to engage releasably with a corresponding plurality of conductors of a second connector part, the plurality of conductors of the second connector part including terminating conductors of one or more thermocouples which, when engaged with respective conductors of the plurality of conductors of the first connector part form a cold reference junction of the one or more thermocouples, the connector having attached to some or all of the plurality of conductors of the first or second connector part a releasable member incorporating one or more temperature sensing components for sensing the temperature in the vicinity of the cold reference junction.

In example embodiments of this second aspect of the present invention, the releasable member comprises a temperature sensor according to the first aspect of the present invention defined above.

In a further example embodiment of this second aspect, the temperature sensing components incorporated within the releasable member are arranged to make an electrical connection with two or more selected conductors of the plurality of conductors of the first or second connector part when fitted to the connector.

According to a third aspect of the present invention, there is provided a thermocouple, comprising first and second conductors joined at a temperature sensing junction and extending to a connector part, the connector part having incorporated therein or affixed thereto a temperature sensor according to the first aspect of the present invention defined above.

According to a fourth aspect of the present invention, there is provided a temperature monitoring system, comprising one or more thermocouples having conductors terminating in a releasable connector, the connector having a first connector part associated with a temperature monitoring module and a second connector part in which the conductors of the one or more thermocouples terminate, the first or second connector part having affixed thereto a releasable member incorporating one or more temperature sensing components for sensing the temperature in the vicinity of the terminating thermocouple conductors.

According to a fifth aspect of the present invention, there is provided an engine management system including a temperature monitoring system according to the fourth aspect of the present invention defined above.

Example embodiments of the present invention will now be described in more detail with reference to the accompanying drawings, of which:

FIG. 3 shows an example connector arrangement to which the temperature sensor in an example embodiment of the present invention has been installed.

It is known to use thermocouples for high temperature measurement, for example in monitoring the temperature at particular points within a jet engine. Such thermocouples may be of one of a number of different types, selected according to the requirements of the particular application. In one example type—a "type K" thermocouple—conductors made from the alloys Chromel® and Alumel® are joined together at a temperature sensing junction and each conductor extends to a reference junction, for example to a so-called 'cold reference junction' of known temperature at which point the potential difference between the conductors may be measured. The temperature at the sensing junction may then be determined according to the known temperature of the cold reference junction, the measured potential difference and a predetermined thermocouple characteristic function for the particular type of thermocouple.

Figure 1:
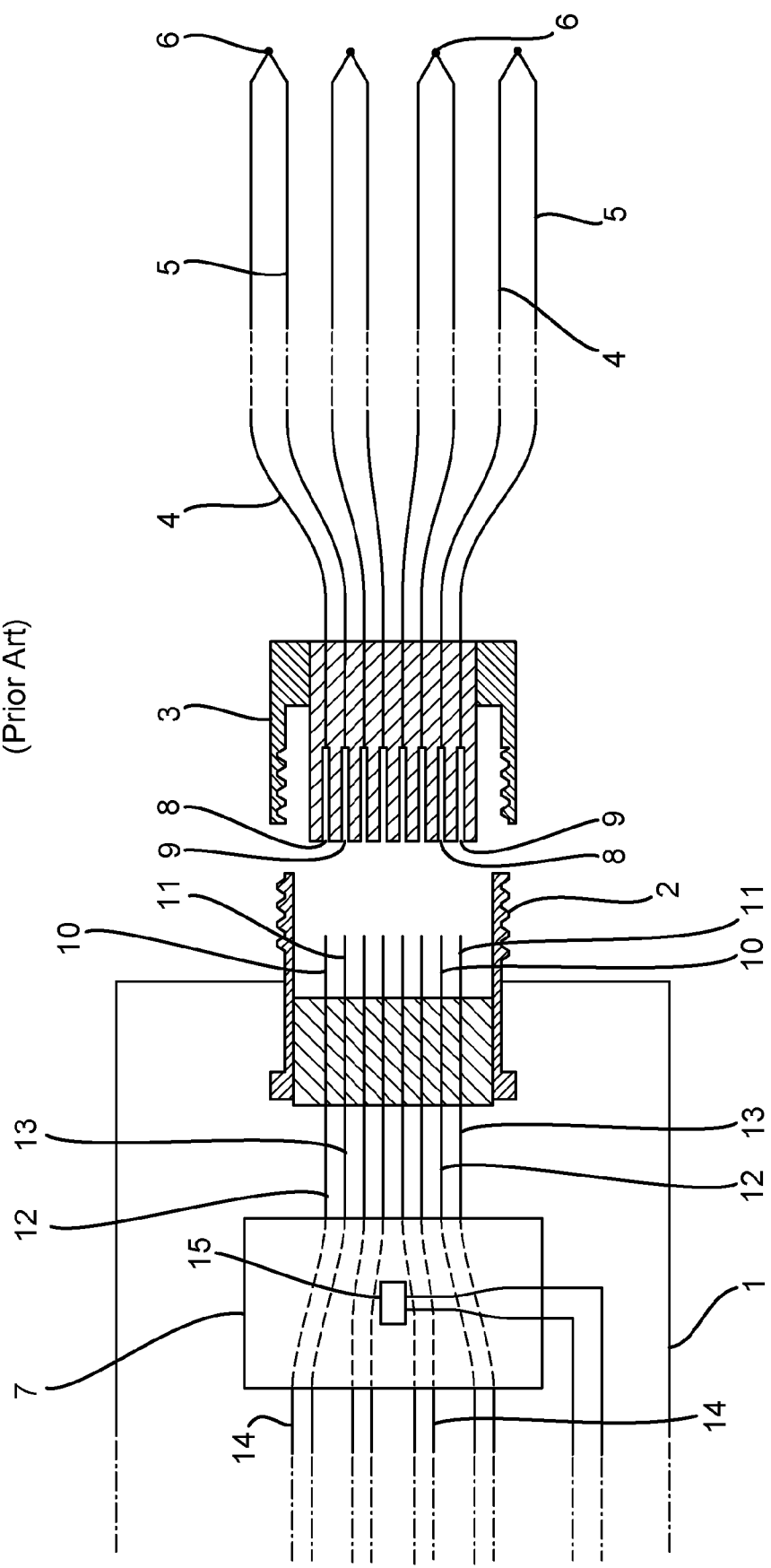
FIG. 1 shows a known temperature monitoring arrangement using thermocouples.

Elements of a typical known temperature monitoring module for use with several thermocouples will firstly be described in outline with reference to FIG. 1. Example embodiments of the present invention will then be described with reference to FIGS. 2 and 3 in the example context of an improvement to the known module of FIG. 1.

Referring initially to FIG. 1, a portion of a known temperature monitoring module 1 is shown, typically comprising voltage measurement electronics and processing capability (not shown in FIG. 1) intended for use with multiple connected type 'K' thermocouples. To enable easy replacement of the module 1, the module 1 is provided with a connector in two parts: a 'male' connector part 2 fixed to the module 1; and a releasable 'female' connector part 3 to which multiple pairs of thermocouple conductors 4, 5 are connected. In this example only four pairs are shown for simplicity. The thermocouple conductors 4, 5 of each thermocouple, made from Chromel® and Alumel® respectively, extend from a temperature sensing junction 6 through the connector parts 2, 3 to a cold reference junction 7 mounted within the module 1. That is, the 'female' connector part 3 is provided with pin sockets 8, 9 made from the same respective thermocouple conductor materials as the connected conductors 4, 5 and the 'male' connector part 2 is provided with pins 10, 11 made from the same respective materials. Each of the connector pins 10, 11 is linked within the module 1 to the cold reference junction 7 by conductors 12, 13, also made from the same respective thermocouple conductor materials such that the thermocouple conductors, comprising the Chromel® conductor sections 4, 8, 10 and the Alumel® conductor sections 5, 9, 11, extend all the way from the temperature sensing junction 6 to the cold reference junction 7. At the cold reference junction 7, the final conductor sections 10, 11 terminate and are connected to copper conductors 14 which then lead to voltage measuring electronics provided within the module 1 (not shown in FIG. 1) for each thermocouple.

A temperature sensor 15 is provided in the vicinity of the cold reference junction 7, for example a thermistor, to enable the electronics and processing functionality within the module 1 to determine the temperature at the cold reference junction 7.

The inventors in the present case have devised a different way in which to provide a cold reference junction and to determine its temperature that enables a simplification of the known temperature monitoring module 1 and associated wiring. In particular, the present invention enables the thermocouple conductors to be terminated in one part of the connector, for example in a 'female' part of the connector as in the connector part 3 shown in FIG. 1, while all the pins of the 'male' connector part may be made from copper as in a conventional connector part, so forming a cold reference junction when the connector parts are engaged. Furthermore, the reference junction 7 would no longer be required within the known temperature monitoring module 1 and all conductors within the simplified temperature monitoring module may be made from copper. A first embodiment of a cold reference junction and associated reference junction temperature determining sensors according to the present invention will now be described with reference to FIG. 2 and to FIG. 3.

Figure 2:
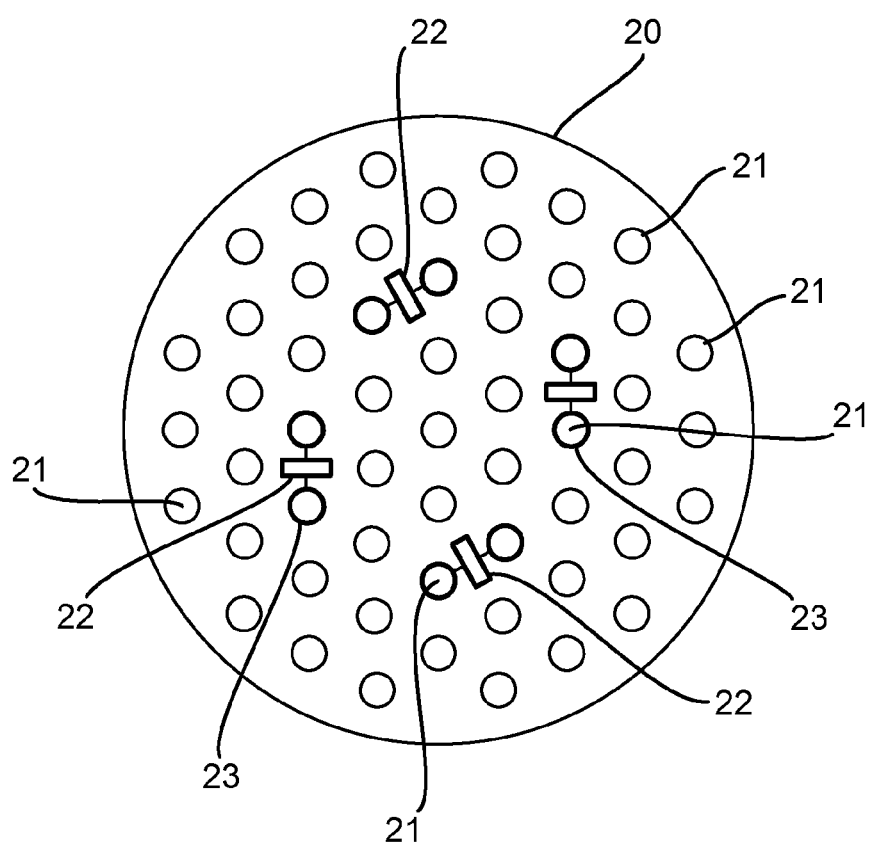
FIG. 2 shows a temperature sensor for determining the temperature of a cold reference junction according to an example embodiment of the present invention.

Referring to FIG. 2 and to FIG. 3, a cold reference junction may be provided at the junction of releasable conductor parts within an otherwise conventional connector. The temperature at the cold reference junction may be determined by a temperature sensor comprising a thin flexible plate-like connector seal 20 of a diameter corresponding substantially to the internal diameter of the housing of a male connector part, for example that part of a connector associated with a temperature monitoring module as in FIG. 1 in which is embedded one or more temperature sensing components 22. Through the seal 20 is formed a pattern of holes 21 corresponding to the pattern of pins of a male connector part, in this example a 55 pin connector of a type used typically in military equipment, e.g. a MIL-DTL-38999 connector type. The seal 20 may be applied to the pins of the 'male' connector part so that the connector pins pass through the corresponding holes 21 through the seal 20 and the seal 20 may be pushed down into a housing of the male connector part, for example by a corresponding 'female' connector part of the connector when the two parts are coupled together. The female connector part may for example be the same connector part 3 with multiple pairs of thermocouple conductors terminating in it, as shown in the known arrangement of FIG. 1, without modification. When the connector parts are fully engaged, the temperature sensor is located close to the cold reference junction formed at the point of connection between respective conductors of the connector.

The one or more temperature sensing components 22 may for example comprise four 'micro'-thermistors, each sufficiently small to fit between a pair of pins of the male connector part when the seal 20 is attached. Each thermistor 22 may be embedded within a region of thermally conductive material (not shown in FIG. 2). The thermally conductive material is typically a different, typically less flexible material to that from which the seal is conventionally made and is intended to create a substantially isothermal region around each thermistor 22 or a single isothermal region that includes all the thermistors 22.

Each thermistor 22 is intended to be electrically connected to a selected pair of pins of the 'male' connector part when the seal is fitted and, from those pins, to electronics and processing functionality in the temperature monitoring module for determination of the reference junction temperature, as in a conventional temperature monitoring module 1. This may be achieved by fitting within each hole of the selected pair of holes through the seal 20 an electrically conducting liner 23 or portion of a liner to which respective conductors of the thermistor 22 are connected. When the seal 20 is pushed onto the pins of the 'male' connector part so that the pins pass through respective holes 21 of the seal 20, an electrical connection is established between the selected pins and the respective conducting liners 23 and so to the respective thermistor 22.

FIG. 3 provides a sectional view through two parts of a 55 pin connector, shown aligned but uncoupled, comprising a 'male' part 30 and a 'female' part 31. When the modified seal 20 is pushed onto the pins of the 'male' connector part 30 and down into the housing of the connector part 30 (as shown in FIG. 3), those pins 32 of the connector selected to make an electrical connection with one of the thermistors 22, are brought into contact with the conducting liner 23 or portions of a liner fitted to the respective holes 21 and so with the respective thermistor 22.

Those pins 33, 34 of the 'male' connector part 30 intended to connect at the cold reference junction with conductors 35, 36 of a thermocouple terminating at respective pin sockets 37, 38 in the 'female' connector part 31 may be made from copper, as in a conventional connector part, and may be linked by copper conductors to associated voltage measuring electronics and processing capability within the temperature monitoring module.

When the modified seal 20 has been pushed down into the 'male' connector part 30 by the 'female' connector part 31, the thermistors 22 are located in close proximity to a face 39 of the 'female' connector part. This ensures that there is good thermal coupling to the junction between the copper pins 33, 34 of the 'male' connector part and the Chromel® and Alumel® pin sockets 37, 38 of the 'female' connector part 31 (in the specific example of a type 'K' thermocouple) at which the potential difference is to be measured by the temperature monitoring module, so satisfying the requirements of a thermocouple 'cold reference junction'.

The thickness of the modified seal 20 is selected such that when inside the housing of the 'male' connector part 31, as shown in FIG. 2, the seal 20 does not prevent the 'female' connector part being adequately coupled to the 'male' part. Furthermore, the natural resilience of the material, e.g. silicon rubber, from which much of the seal 20 is made, ensures that good electrical contact is maintained between the conducting liners 23 in the holes 21 through the seal and the respective pins 32 of the connector part 30 when the seal 20 is fitted.

In a temperature monitoring module intended for use with the present invention thermocouple voltage measurement electronics for each thermocouple may be linked directly to the respective pins 33, 34 of the associated 'male' connector part 30. The cold reference junction temperature determining electronics may be linked directly to the pins 32 of the associated 'male' connector part 30. Further processing functionality may be included to use reference junction temperature measurements available from each of the thermistors 22 in such a way as to exploit the redundancy available through providing multiple thermistors 22 in the seal 20. In one embodiment, an average temperature may be determined based upon the temperatures measured by each thermistor 22, subject to monitoring any uncharacteristic level of divergence between the temperature sensed by any one thermistor 22 as compared with that by the others, allowing for a faulty thermistor 22 to be detected and isolated. The seal 20 may be easily replaced if the reference junction temperature may no longer be determined reliably, for example due to multiple thermistor failures.

Whereas the first embodiment has been described for use with a connector type having conductor pins and conductor pin sockets, the temperature sensor of the present invention may be arranged to fit into a connector with any other arrangement of conductors such that the temperature sensing components are in thermal contact with a cold reference junction formed within the connector. Alternative arrangements of conductors may include flat conducting tabs arranged upon a non-conducting support member positioned centrally or around an internal wall of the connector parts, or a combination of conducting tabs and conducting pins and pin sockets.

In a second embodiment of the present invention, the reference junction components 22, 23 may be applied, in a similar configuration to that shown in FIG. 2, to the 'female' connector part 3 in which the thermocouple conductors terminate, as a permanent feature of the connector part. For example, the thermistors 22 may be embedded in a region of thermally conductive material within the body of the 'female' connector part 3, in the vicinity of terminating thermocouple conductors 4, 5 and electrically connected with a pair of pin sockets to which the thermistor pins 32 of the 'male' connector part 2 engage. In this way, the reference junction temperature indicated by the thermistors 22 may be determined by the temperature monitoring module in the same way as for the first embodiment where the thermistors 22 are incorporated into a removable seal 20.

Embodiments of the present invention may be applied across a range of temperature monitoring applications in which thermocouples are used, for example with engines of various types, heating systems and industrial processes.

Variants in the implementation of a cold reference junction within a releasable connector and of an associated temperature sensor and thermocouple temperature monitoring module embodying the principles underlying the example embodiments of the present invention described, as would be apparent to a person of ordinary skill in the relevant field, are intended to be included within the scope of the invention as now claimed. For example, a temperature sensor according to embodiments of the present invention may be adapted for use with different connector types, whether as a detachable component or as a sensor intended to be a permanent feature of the connector.

The invention claimed is:

1. A temperature sensor comprising:
a connector having a plurality of conductors;
a connector seal of an electrically insulating material having a plurality of holes arranged to correspond with the plurality of conductors in the connector;
one or more temperature sensing components embedded within or affixed to the connector seal; and
at least one electrically conductive liner fitted within at least one of the holes of the connector seal, the at least one electrically conductive liner configured to make electrical contact with at least one of the one or more temperature sensing components.

2. The temperature sensor according to claim 1, wherein the connector comprises a first connector part having the plurality of conductors, the first connector part arranged to engage releasably with a second conductor part having a corresponding plurality of conductor sockets.

3. The temperature sensor according to claim 2, wherein the connector seal is fitted over the plurality of conductors of the first connector part.

4. The temperature sensor according to claim 2, wherein the temperature sensor is releasably engaged with the conductors of the connector.

5. The temperature sensor according claim 1, wherein the connector seal comprises a flexible material.

6. The temperature sensor according to claim 1, wherein the connector seal includes a region comprising a thermally conductive material, wherein the one or more temperature sensing components is or are embedded within or arranged in contact with the region of thermally conductive material, and wherein a substantially isothermal region of the connector seal is in a vicinity of the one or more temperature sensing components.

7. A thermocouple assembly, comprising:
a connector part comprising the temperature sensor according to claim 1; and
first and second conductors joined at a temperature sensing junction and extending to the connector part.

8. A thermocouple connector comprising:
a first connector part having a plurality of conductors;
a second connector part having a corresponding plurality of conductors, the plurality of conductors of the second connector part including terminating conductors of one or more thermocouples, the one or more thermocouples being releasably engaged with respective conductors of the plurality of conductors of the first connector part to provide a cold reference junction of the one or more thermocouples;
a connector seal of an electrically insulating material having a plurality of holes; one or more temperature sensing components embedded within or affixed to the connector seal, the one or more sensing components configured to sense the temperature in the vicinity of the cold reference junction; and
at least one electrically conductive liner fitted within at least one of the holes of the connector seal, the at least one electrically conductive liner configured to make electrical contact with at least one of the one or more temperature sensing components.

9. The thermocouple connector according to claim 8, wherein the connector seal comprises an electrically insulating material having a shape and configuration arranged to correspond to the plurality of conductors of the first connector part or the plurality of conductors of the second connector part.

10. The thermocouple connector according to claim 8, wherein the connector seal is fitted to the first connector part or the second connector part, and wherein the one or more temperature sensing components are arranged to make an electrical connection with two or more conductors of the plurality of conductors of the first connector part or two or more conductors of the plurality of conductors of the second connector part.

11. The thermocouple connector of claim 8, wherein the connector seal comprises a flexible material.

12. The thermocouple connector of claim 8, wherein the plurality of holes of the connector seal are arranged to correspond with at least one of the plurality of conductors of the first connector part or at least one of the plurality of conductors of the second connector part.

13. The thermocouple connector of claim 8, wherein the connector seal is releasably engaged with at least one of the plurality of conductors of the first connector part or at least one of the plurality of conductors of the second connector part.

14. A temperature monitoring system, comprising:
connector seal of an electrically insulating material having a plurality of holes;
one or more temperature sensing components for sensing the temperature in a vicinity of the plurality of holes; and
at least one electrically conductive liner fitted within at least one of the holes of the connector seal, the at least one electrically conductive liner configured to make electrical contact with at least one of the one or more temperature sensing components.

15. An engine management system including a temperature monitoring system according to claim 14.

16. The temperature monitoring system of claim 14, wherein the connector seal comprises a flexible material.

17. The temperature monitoring system of claim 14, further comprising one or more thermocouples having conductors terminating in a releasable connector, the releasable connector having a first connector part and a second connector part in which the conductors of the one or more thermocouples terminate, wherein the plurality of holes of the connector seal are arranged to correspond with at least one of the plurality of conductors of the first connector part or at least one of the plurality of conductors of the second connector part.

18. The temperature monitoring system of claim 17, wherein the connector seal is releasably engaged with at least one of the plurality of conductors of the first connector part or at least one of the plurality of conductors of the second connector part.

19. The temperature monitoring system of claim 17, wherein the conductors of the one or more thermocouples provide a cold reference junction.

* * * * *